United States Patent
Kuras et al.

(10) Patent No.: US 8,205,444 B2
(45) Date of Patent: Jun. 26, 2012

(54) HYDROSTATIC PUMP AND MOTOR WITH IMPROVED TORQUE REVERSAL CHARACTERISTICS

(75) Inventors: Brian D. Kuras, Metamora, IL (US);
Michael G. Cronin, Peoria, IL (US);
Frank Anthony DeMarco, East Peoria, IL (US); Tyler Bowman, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 816 days.

(21) Appl. No.: 12/255,350

(22) Filed: Oct. 21, 2008

(65) Prior Publication Data

US 2010/0095665 A1    Apr. 22, 2010

(51) Int. Cl.
*F16H 39/00* (2006.01)
*F16H 61/40* (2010.01)
(52) U.S. Cl. .......................................... 60/464; 60/456
(58) Field of Classification Search ................. 60/456, 60/459, 464
See application file for complete search history.

(56) References Cited

U.S. PATENT DOCUMENTS

| | | | |
|---|---|---|---|
| 3,593,519 A | 7/1971 | Fuhrimann | |
| 3,925,987 A * | 12/1975 | Faisandier | 60/456 |
| 4,531,369 A | 7/1985 | Izumi et al. | |
| 4,930,455 A | 6/1990 | Creed et al. | |
| 4,939,900 A * | 7/1990 | Furumoto et al. | 60/456 |
| 5,613,361 A | 3/1997 | Dantlgraber et al. | |
| 5,746,509 A * | 5/1998 | Gebhard et al. | 60/456 |
| 6,145,312 A * | 11/2000 | Hauser et al. | 60/464 |
| 6,338,247 B1 | 1/2002 | Drin | |
| 6,339,928 B1 | 1/2002 | Göllner | |
| 6,427,441 B2 | 8/2002 | Wüstefeld et al. | |
| 6,430,923 B1 * | 8/2002 | Meier | 60/464 |
| 6,739,127 B2 | 5/2004 | Nippert et al. | |
| 6,966,180 B2 | 11/2005 | Deneir et al. | |
| 7,111,458 B2 * | 9/2006 | Gandrud | 60/464 |

* cited by examiner

*Primary Examiner* — Thomas E Lazo
(74) *Attorney, Agent, or Firm* — Leydig, Voit & Mayer (57) ABSTRACT

A system and method for variator control employs positively directed electronic make-up and flushing relief valves for more precise torque control of a hydraulic variator, especially during torque reversal, as well as improved cold weather operation. This can improve machine response during periods of severe torque change. The ability to more tightly control variator torque allows more precise torque management algorithms for power control and engine matching purposes. Moreover, the ability to positively control venting of the hydraulic circuit for purposes of fluid cooling allows for more consistent machine response regardless of ambient temperature.

19 Claims, 5 Drawing Sheets

HYDROSTATIC PUMP AND MOTOR WITH IMPROVED TORQUE REVERSAL CHARACTERISTICS

TECHNICAL FIELD

This patent disclosure relates generally to continuously variable transmissions and, more particularly to a variator with improved torque reversal characteristics for use in such transmissions.

BACKGROUND

It is often useful in powering industrial and other machines to employ a transmission that allows for a smooth transmission through a series of effective transmission ratios. Such transmissions include what is known as a continuously variable transmission. This class of transmissions allows a somewhat continuously variable range of transmission ratios without excessive and distinctive "shifts" between fixed gears. One way of providing a CVT is employ a split torque system wherein one input to the transmission is the engine torque while a second input is from a device known as a variator. The variator is a hydraulic device that includes a hydraulic pump coupled to a hydraulic motor in such a way that the speed or torque output can be varied by varying a parameter of the pump, such as a swash plate setting.

In order to provide a full range of transmission ratios, the variator is typically required to provide torque in either direction as needed, and to be able to reverse the direction of rotation as quickly as possible during operation. Such an event is referred to as a torque reversal, and the point in time at which such an event occurs is referred to as a torque reversal point. Unfortunately, it is not possible with known technology to accurately and quickly reverse the variator torque. This failure to smoothly reverse the variator can lead to jerky and even unstable operation of the transmission.

One of the areas to smoothly reverse the torque lies internally within the variator, namely the hydraulic circuit or connection between the pump and motor. This system must accommodate hydraulic fluid at very high pressure, e.g., thousands of PSI, and must be able to allow the pressures to reverse on short notice. Because of the inefficiencies and imperfections in the system, a number of "make-up" valves are used to ensure that the system or circuit is always filled with hydraulic fluid from an external hydraulic source. The external hydraulic source of fluid may be required to deliver fluid to one part of the hydraulic circuit and then switch and almost instantaneously (e.g., within tens of milliseconds) deliver fluid to the second part of the hydraulic circuit. This means that at times, a first one of the make-up valves will be open and will supply make-up flow to the system, while at other times, the first valve will be closed and a second valve will instead supply make-up flow to the system. The shutting of one make-up valve and the opening of the other make-up valve has been found by the inventors to be a limiting factor in the torque reversal of the variator. In particular, these valves are traditionally one-way hydrostatic check valves, and as such, may experience a time lag before completely closing, thus disturbing or interrupting the torque or pressure reversal.

The hydraulic system or circuit also typically includes a flushing relief valve for returning hydraulic fluid from the hydraulic circuit to a supply tank. However, the response time of this valve is also a source of delay in controlling the variator or managing the torque, in that it may provide a pressure loss path before closing.

Efforts have been made to improve the torque reversal characteristics of the variator in such systems by improving the tolerances in the valves of interest and decreasing their damping and inertia. However, a suitable system has yet to be developed that sufficiently reduces the lag of the system valving, and as such, adequately improves the torque reversal operation of the variator.

SUMMARY

The disclosure describes, in one aspect, a hydraulic variator system for improved torque reversal performance, the variator system including a hydraulic variator pump linked to a hydraulic variator motor via a hydraulic circuit. In an embodiment, the hydraulic circuit includes a first hydraulic line connecting the hydraulic variator pump to the hydraulic variator motor and a second separate hydraulic line connecting the hydraulic variator pump to the hydraulic variator motor. A make-up hydraulic circuit bridges the first hydraulic line and the second hydraulic line, and includes first and second electronically actuatable valves having mutually exclusive open states, the first electronically actuatable valve linking the first hydraulic line to a fluid source and the second electronically actuatable valve linking the second hydraulic line to the fluid source.

In another embodiment, the disclosed principles pertain to a method for providing improved torque reversal performance in a hydraulic variator system having a hydraulic variator pump linked to a hydraulic variator motor via a hydraulic circuit having separate first and second hydraulic lines connecting the hydraulic variator pump to the hydraulic variator motor, and a make-up hydraulic circuit associated with the first and second hydraulic lines, the make-up hydraulic circuit including first and second electronically actuatable valves for supplying fluid to the first and second hydraulic lines respectively. In this embodiment, the method entails monitoring a commanded variator torque value, monitoring a pressure of the first hydraulic circuit and the second hydraulic circuit, and determining whether a torque reversal is imminent based on the monitored pressure. The states of the first and second electronically actuatable valves are reversed if a torque reversal is imminent and if the monitored pressure has crossed into a predefined dead band.

In a further embodiment of the disclosed principles, computer-readable medium is provided having recorded thereon computer-executable instructions for providing improved torque reversal performance in a hydraulic variator system including a hydraulic variator pump linked to a hydraulic variator motor via a hydraulic circuit having separate first and second hydraulic lines connecting the hydraulic variator pump to the hydraulic variator motor, and a make-up hydraulic circuit associated with the first and second hydraulic lines, the make-up hydraulic circuit including first and second electronically actuatable valves for supplying fluid to the first and second hydraulic lines respectively, the computer-executable instructions comprising. The instructions include instructions for monitoring a commanded variator torque value, instructions for monitoring a pressure of the first hydraulic circuit and the second hydraulic circuit, and instructions for determining whether a torque reversal is imminent based on the monitored pressure. Also included are instructions for reversing a state of each of the first and second electronically actuatable valves if a torque reversal is imminent and if the monitored pressure has crossed into a predefined dead band.

BRIEF DESCRIPTION OF THE DRAWINGS

The disclosed principles will be better understood from the included Detailed Description, read in conjunction with the included figures of which.

DETAILED DESCRIPTION

This disclosure relates generally to machines requiring a transmission to link a power source to the final ground-engaging mechanism, e.g., wheels, tracks, etc. Examples of such machines include machines used for mining, construction, farming, transportation, or any other industry known in the art. However, it will be appreciated that many other types of machines, similar to or different from those listed, may benefit from the disclosed principles as well.

Figure 1:
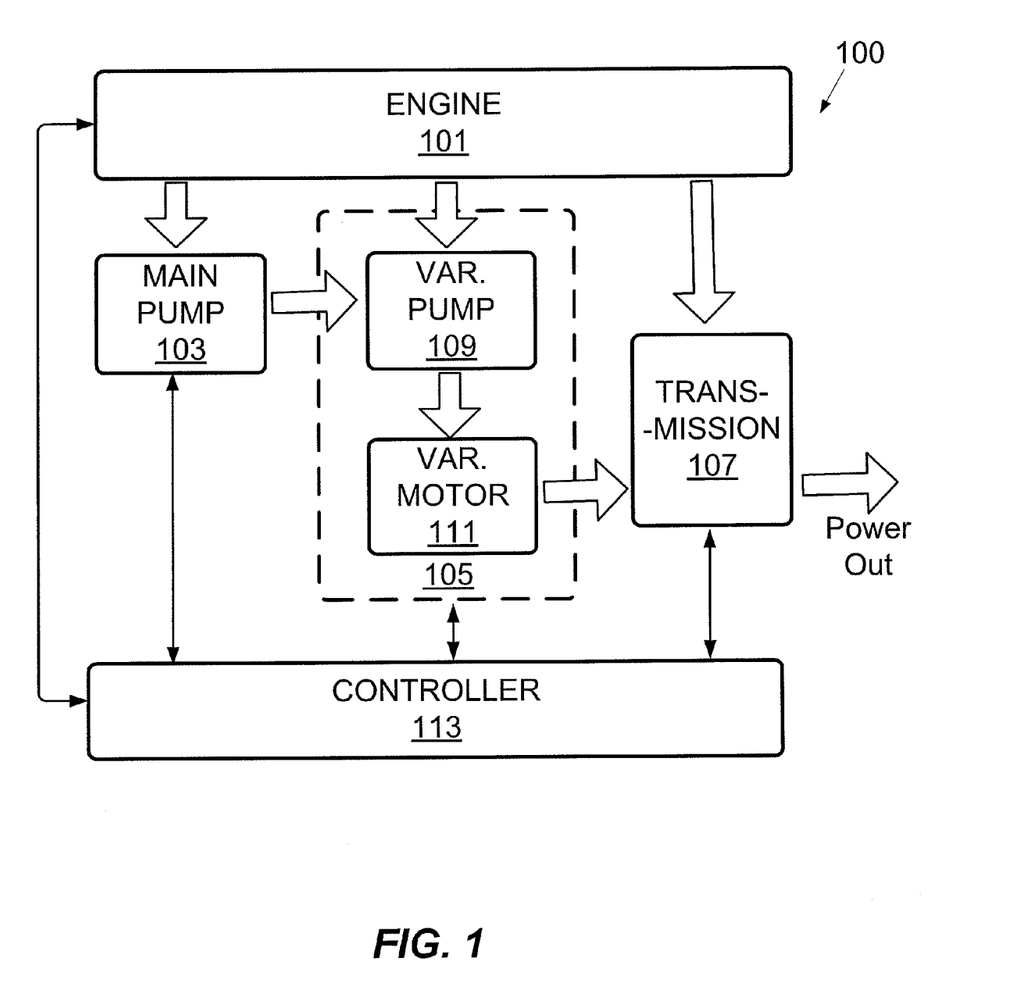
FIG. 1 is a schematic illustration showing an example of power, data and control flow within a CVT system in accordance with the disclosed principles.

FIG. 1 is a schematic illustration showing an example of power, data and control flow within a CVT system 100. The CVT system 100 includes an engine 101, main hydraulic pump 103, variator 105, and transmission 107. The variator 105 includes a variator pump 109 and a variator motor 111. The CVT system 100 includes a controller 113 for monitoring and controlling the operation of the CVT system 100. It will be appreciated that while the system illustrated in FIG. 1 is a split torque system, other types of system may instead be used. For example, the disclosed principles will also provide benefits within a simple direct series hydrostatic ("hystat") system, with the engine driving the pump which supplies fluid to the motor which is connected to the output of the transmission.

The power in the CVT system 100 originates from the engine 101. The engine 101 supplies power to the transmission 107 and the variator pump 109 via direct input, and also supplies power to the main hydraulic pump 103. The main hydraulic pump 103 supplies fluid via the fluid supply line to the variator 105. The power output of the system is provided by the transmission 107.

The controller 113 receives operational data from the engine 101, variator 105, and transmission 107. The controller 113 controls the operation of the engine 101, variator 105, and transmission 107 in response to this data, and in accordance with user input and potentially other information related to operating goals and/or conditions.

Figure 2:
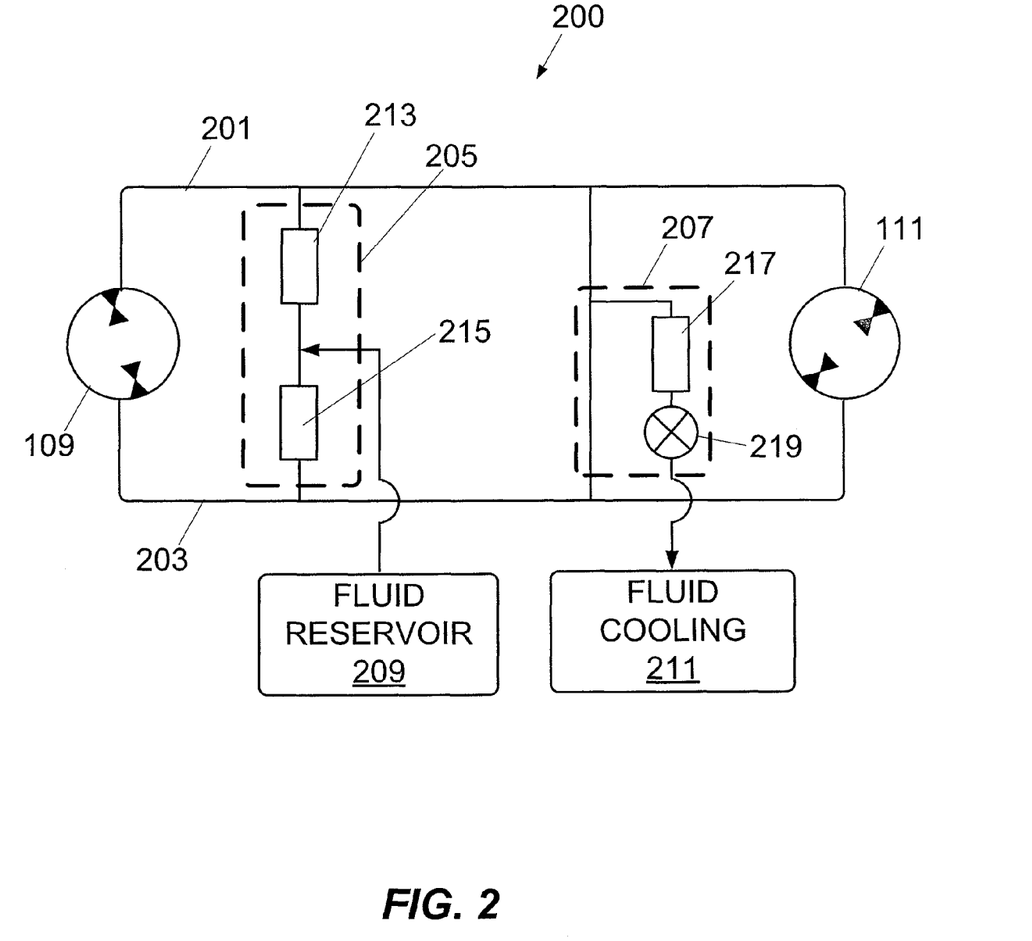
FIG. 2 is a detailed schematic of a hydraulic circuit arranged in keeping with the disclosed principles.

The power flow between the variator pump 109 and a variator motor 111 occurs via a hydraulic circuit, which is not included in FIG. 1, but which is shown in detail in FIG. 2. The illustrated hydraulic circuit 200 includes, in an embodiment, a first hydraulic line 201 connecting the variator pump 109 and the variator motor 111, as well as a second hydraulic line 203 connecting the variator pump 109 and the variator motor 111. At any moment during operation of the variator 105, one of the first and second lines will be a high-pressure line while the other line will be a low-pressure line or at a fixed system charge pressure set by the main pump 103. Because the variator pump 109 is a variable displacement pump, the low pressure line may become the high pressure line during a torque reversal event or when the pump displacement is being changed.

The first hydraulic line 201 and the second hydraulic line 203 are cross-connected via a make-up circuit 205 and a flushing cooling circuit 207. The make-up circuit 205 includes at least a first isolation valve 213 and a second isolation valve 215, acting to ensure that the hydraulic circuit 200 is full of hydraulic fluid by providing fluid at a relatively low positive pressure from a fluid reservoir 209 set by the main pump 103.

The flushing cooling circuit 207 serves to flush fluid to a fluid cooling facility 211, e.g., to limit the maximum temperature of the variator 105. The flushing cooling circuit 207 includes a third isolation valve 217 that allows fluid to be removed from the hydraulic circuit 200. The isolation valve 217 selects the lower pressure from hydraulic line 201 and hydraulic line 203. Any fluid removed from the circuit 200, once cooled, may be later returned to the circuit 200.

As the variator pump 109 supplies a high pressure to the first hydraulic line 201, the first isolation valve 213 remains closed, and the fluid in the circuit in the second hydraulic line 203 is made up via the second isolation valve 215 (valve is open). Conversely, when the variator pump 109 supplies a high pressure to the second hydraulic line 203, the second isolation valve 215 remains closed, and the fluid in the first hydraulic line 201 is made up via the first isolation valve 213 (valve is open). In this way, the hydraulic circuit 200 is kept full of hydraulic fluid to avoid malfunction.

Figure 3:
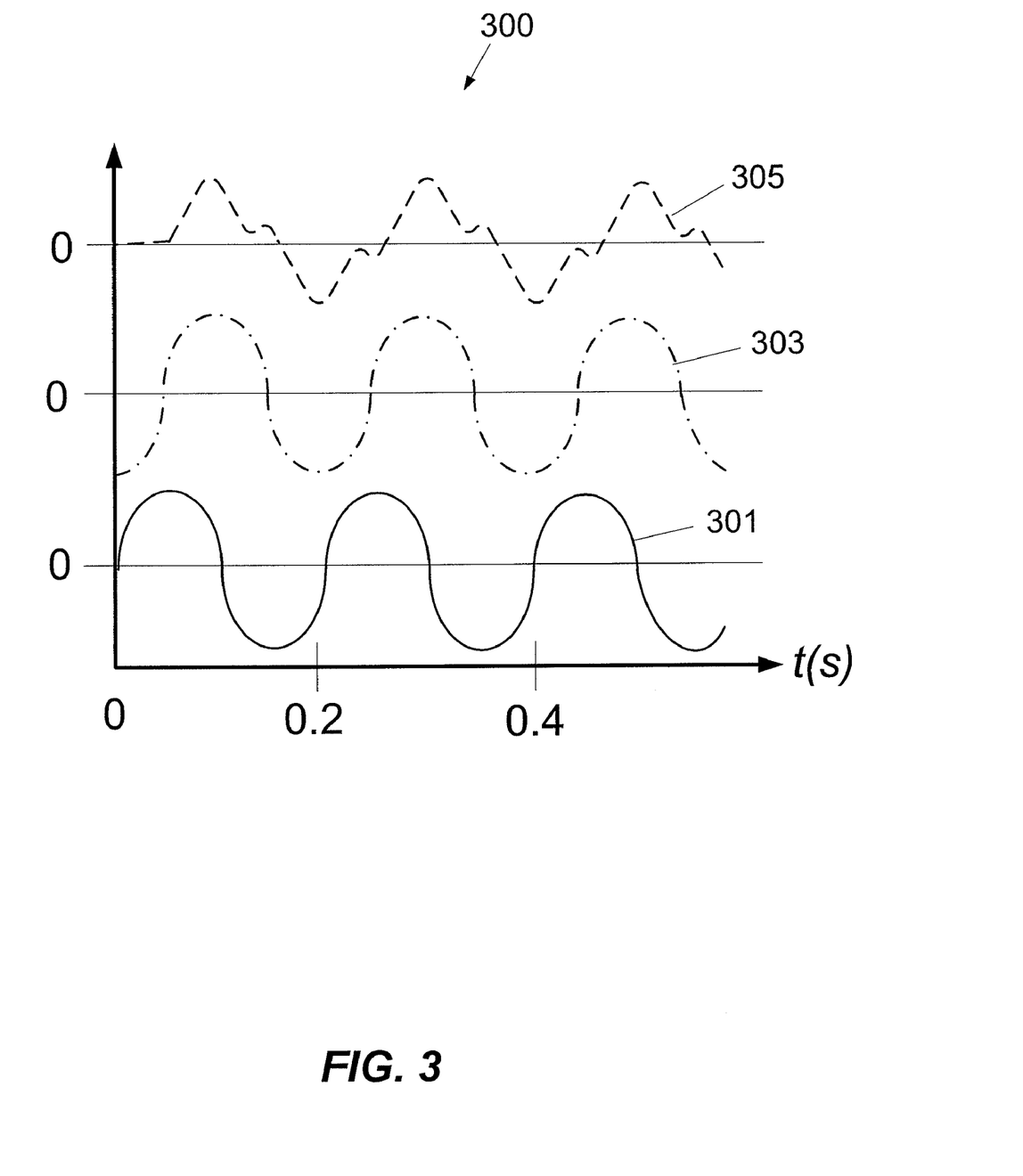
FIG. 3 is a simplified time plot showing various torque values and commands as a function of time during high frequency torque reversing operation.

The operation of the CVT system 100 according to the disclosed principles will be discussed in detail after a brief discussion of the physical properties of typical and ideal torque reversal scenarios. FIG. 3 is a simplified time plot 300 showing various torque values and commands as a function of time during high frequency (e.g., 5 Hz or more) operation. In particular, a commanded variator torque value 301 is shown as a function of time. It can be seen that the commanded variator torque value 301 is essentially sinusoidal with a frequency of about 5 Hz. The ideal output torque of the variator 105 would also follow a sinusoidal curve 303, with the same frequency, perhaps delayed by response time. However, the actual responsive torque output typically appears as shown in curve 305.

The reason for the nonsinusoidal shape of the responsive torque lies with the make-up circuit 205 traditionally used and/or the flushing cooling circuit 207. In particular, because the circuit traditionally employs hydromechanical valves, a reversal in applied circuit pressure does not lead to an immediate corresponding reversal in actual circuit pressure. Rather, as the applied circuit pressure reverses at the instant of the torque reversal from the variator pump 109, the previously low pressure side of the circuit is driven toward a high pressure value. However, the make-up check valve associated with this side of the circuit is still momentarily open (eventually will close), leading to a delay in reaching full pressure. The induced pressure delays and pressure variations lead to delays and variations in the output torque of the variator 105.

Delays associated with the third isolation valve 217 associated with the flushing cooling circuit 207 could also cause the same torque reversal problem. For example, as the applied circuit pressure reverses at the instant of the torque reversal from the variator pump 109, the previously low pressure side of the circuit (which is being flushed or drained via the flushing cooling circuit 207) is driven towards high pressure. However, if the third isolation valve 217 is slow, then the isolation valve 217 will momentarily be flushing the high pressure, thus momentarily preventing the pressure from rising.

However, in an embodiment of the disclosed principles, the make-up circuit 205 and a flushing cooling circuit 207 employ positively controlled electronically actuated valves so that the timing and operation of these valves is a function of applied electronic control signals and is independent of pressure variations within the hydraulic circuits. Because all valves, including electronically actuated valves, have some finite response time, the electronic control signals preferably account for the known delay characteristics of the valves. In one embodiment, the third isolation valve 217 is a traditional hydraulically actuated three-way valve, and a flushing cooling isolation valve 219 is provided within the flushing cooling circuit 207.

Figure 4:
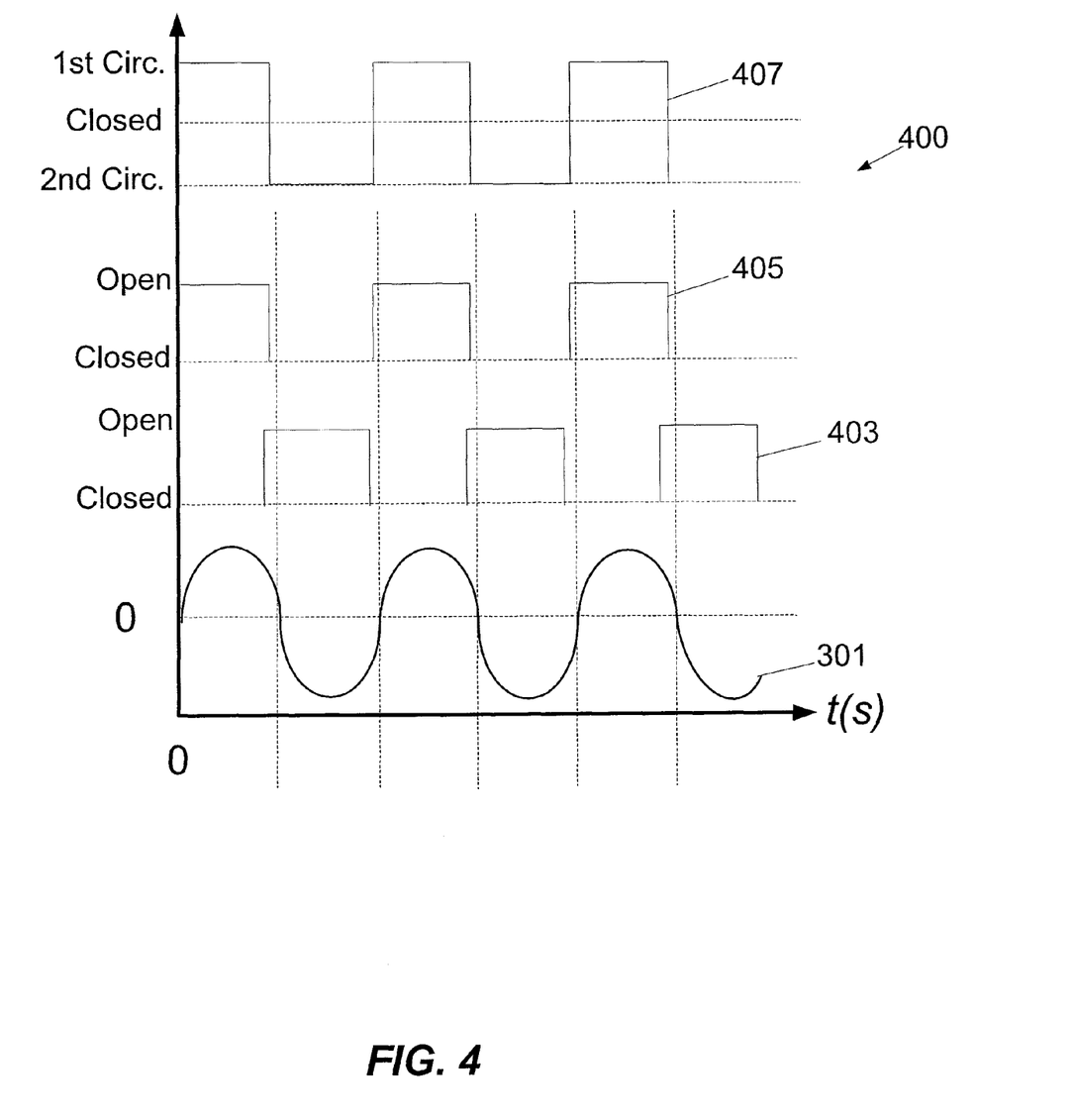
FIG. 4 is a simplified time plot showing electronic valve control signals for the first isolation valve and the second isolation valve pursuant to the commanded variator torque value in accordance with the disclosed principles.

FIG. 4 is a simplified time plot 400 showing electronic valve control signals for the first isolation valve 213, the second isolation valve 215, and the third isolation valve 217 corresponding to the commanded variator torque value 301. For simplification, the additional dependence of valve timing on circuit pressure is not illustrated, but was described above. In the illustrated embodiment, the first isolation valve 213, second isolation valve 215 and third isolation valve 217 are electronically actuated solenoid valves and may be proportional or switching valves. The third isolation valve 217 is a three-way valve for selecting the first circuit 201, the second circuit 203, or neither circuit. It will be appreciated that other types of electronically actuated valves may be employed instead with corresponding modifications to the illustrated control signals. Referring now to the control signals illustrated in FIG. 4, when a torque reversal is indicated by the commanded variator torque value 301 and the actual pressure in the circuits 201 and 203 is near reversal (e.g., has crossed a predetermined dead band near charge pressure set by fluid reservoir 209, such as 350±100 PSI), the corresponding high pressure side isolation valve is closed.

The first isolation valve 213 is controlled by the digital signal 405 and the second isolation valve 215 is controlled by the digital signal 403. The third isolation valve 217 is controlled by the digital signal 407. Thus, when the commanded variator torque value 301 is positive and the pressure in both circuits has crossed the predetermined dead band, the first isolation valve 213 is opened by the digital signal 405 and the second isolation valve 215 is closed by the digital signal 403. Simultaneously, the third isolation valve 217 switches states from one circuit to the other as can be seen based on digital signal 407.

It can be seen that the digital signal 405 transitions to a high value slightly prior to the time the commanded variator torque value 301 actually crosses the zero value threshold and the actual pressure crosses a predetermined dead band. This is an accommodation for the delay inherent in the valve structure due to inertia, inductance, etc. Similarly, when the commanded variator torque value 301 is negative, the second isolation valve 215 is opened by the digital signal 403 while the first isolation valve 213 is closed by the by the digital signal 405. As with valve opening, it will be appreciated that valve closing also occurs slightly prior to the commanded variator torque value 301 actually crossing the zero value threshold and the actual pressure crosses a predetermined dead band. The third isolation valve 217 is similarly operated in a manner that anticipates and accommodates the inherent valve delay.

The digital signal 403, digital signal 405 and digital signal 407 are generated by the controller 113 and transmitted to the respective valves based on sensed data regarding the operation of the components of the CVT system 100. The values of the direction and rate of change of the commanded variator torque value 301 are used to calculate the likely timing of an impending zero crossing. For example, a shallow rate of change toward zero while the actual commanded variator torque value 301 is near zero would indicate a longer time to reach zero crossing. The predicted zero crossing time can be used in an embodiment to set the opening and closing timing of the first isolation valve 213 and the second isolation valve 215. In addition, the actual pressure in the hydraulic lines 201 and 203 are measured and used to determine when to turn on/off the respective isolation valves 213, 215 and 217 as described above. For example, as a precondition to switching the states of the on/off valves in an embodiment, the circuit pressure must cross a predetermined dead band in addition to the torque command indicating an impending zero crossing.

Figure 5:
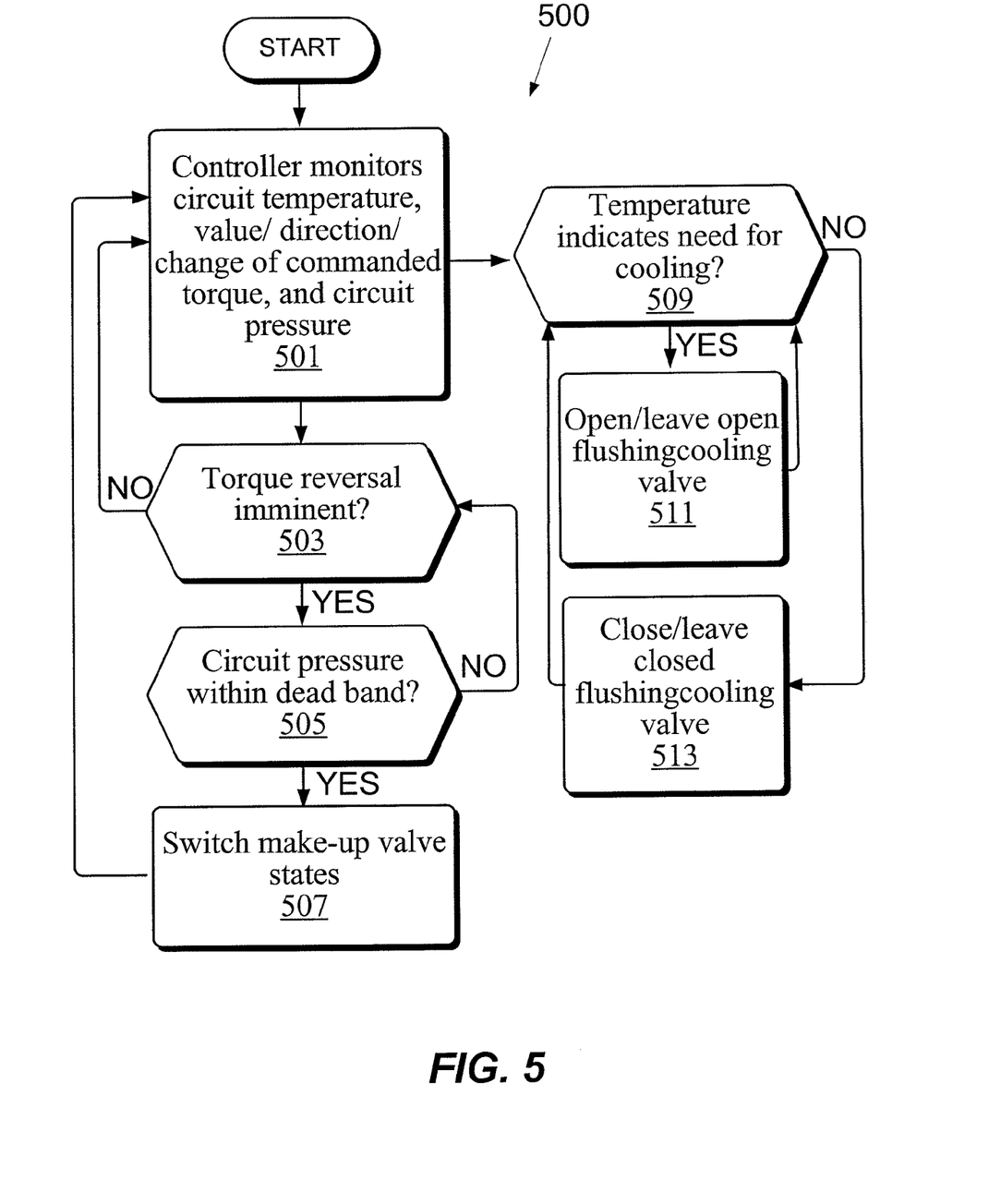
FIG. 5 is a flow chart showing an exemplary process for controlling a hydraulic circuit in accordance with the disclosed principles.

An exemplary process 500 for controlling the hydraulic circuit 200 is illustrated in flow chart form in FIG. 5. The process 500 will be described assuming a hardware architecture substantially as illustrated in FIG. 1 and FIG. 2. However, it will be appreciated that the disclosed principles may be implemented within other arrangements as well.

At stage 501 of the process 500, the controller 113 monitors the value, direction, and rate of change of the commanded variator torque value 301. The controller 113 also monitors a temperature of the hydraulic circuit 200, e.g., a fluid temperature at the variator motor 111. In addition, the controller 113 monitors the pressures of the first hydraulic circuit 201 and the second hydraulic circuit 203. Based on the measured values, the controller 113 determines at stage 503 whether a torque reversal is imminent. The threshold for whether a reversal is considered to be "imminent" may be adapted for the physical implementation at issue, but in an embodiment, a torque reversal is determined to be imminent if it is predicted to occur within two valve delay periods of the present time.

If at stage 503 it is determined that a torque reversal is imminent, then at stage 505 the controller 113 determines whether the pressure in the hydraulic circuits has crossed the predetermined dead band as discussed above. If it is determined that the circuit pressure has crossed the predetermined dead band, then the controller 113 commands the oncoming high side make-up valve to close and the oncoming low side make-up valve to open at a time that is a known delay period before the time of the predicted torque reversal at stage 507. The signals sent to execute the opening and closing of the valves may be as illustrated in FIG. 4 or otherwise, depending on the implementation details.

In parallel with steps 501-507, the controller 113 also executes flushing in an appropriate manner. In particular, at stage 509 the controller 113 determines, based on the measured variator 105 temperature, whether the variator 105 needs to be cooled. If the variator 105 is determined to be too hot, then the digital signal to third isolation valve 217 is set to allow flushing from the appropriate circuit at stage 511 (assuming that the conditions of steps 503-505 are also met) to vent hydraulic fluid for cooling. Otherwise, the third isolation valve 217 is closed or allowed to remain closed at stage 513. It will be appreciated that rather than allowing flushing based on excess temperature, the controller 113 may instead be programmed to disallow flushing based on insufficient temperature.

Thus, via process 500, the first make-up valve 213 and the second make-up valve 215 are positively controlled in anticipation of an impending torque reversal, thus speeding the response time of the hydraulic pressure and hence the hydraulic motor 111 of the variator 105. This allows for more tightly controlled torque since the output of the variator 105 more closely follows the shape of the torque command, lessening torque lag and overshoot and avoiding variator oscillations.

Moreover, hydraulic fluid is vented for cooling only when needed, based on temperature. This has the advantage of maintaining a more constant circuit temperature, as well as conserving power that would otherwise be released hydraulically via the flushing cooling circuit 207.

In an embodiment, the third isolation valve 217 is an electrical proportional valve. In this embodiment, the degree to which the third isolation valve 217 is opened at stage 511 can be based upon the extent to which cooling (warming) is needed, i.e., the extent to which the variator 105 temperature is too hot (cold). For example, if the variator 105 is much hotter than desired, the third isolation valve 217 may be opened fully, whereas if the variator 105 is just slightly hotter than desired, then the third isolation valve 217 may be opened only partially.

In a further embodiment, a flushing cooling isolation valve 219 is located in the flushing cooling circuit 207. In this way, the third isolation valve 217 may be replaced by a standard hydrostatically actuated valve, and the flushing cooling isolation valve 219 may be used to throttle the flushing function based on temperature. Thus, even if the standard hydrostatically actuated valve exhibits a substantial delay, it will be isolated during torque reversal so that it will not flush the high-pressure side of the circuit during torque reversal.

It will be appreciated by those of skill in the art that the controller 113 executes the foregoing process 500 and other operations by receiving electrical inputs, e.g. from machine systems or user interface elements, and providing electrical outputs, e.g., to control machine elements and components. It will be further appreciated that the controller 113 operates according to a computer-readable medium associated with the controller 113 and having recorded thereon computer-executable instructions (e.g., program code), often in conjunction with computer-readable data (e.g., machine parameters, set points, thresholds, etc.). The computer-readable medium may be of any variety, and while the term "computer-readable medium" as used herein, including as used without qualifier in the attached claims, includes only tangible media, e.g., magnetic discs, optical discs, flash memory, EPROMs, RAM, ROM, etc., the disclosed principles are also applicable with respect to intangible media such as optical waves, electrical waves, magnetic waves, acoustical waves, and transmission media of all kinds.

INDUSTRIAL APPLICABILITY

The present disclosure is applicable to any system containing a hydraulic variator with a hydraulic pump driving a hydraulic motor that may undergo torque reversal, especially though not necessarily at higher rates of change. Such systems include hydraulic drive trains, split torque transmissions and the like, as may often be used on large industrial machines and transportation systems. The described innovation allows numerous benefits in various implementations. For example, the ability to more tightly control variator torque allows more precise torque management algorithms for power control and engine matching purposes. The ability to positively control venting of the hydraulic circuit 200 for purposes of fluid cooling allows for a more constant fluid temperature, better cold weather operation, and more consistent machine response.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A hydraulic variator system for improved torque reversal performance, the variator system including a hydraulic variator pump linked to a hydraulic variator motor via a hydraulic circuit, the hydraulic circuit comprising: a first hydraulic line connecting the hydraulic variator pump to the hydraulic variator motor; a second separate hydraulic line connecting the hydraulic variator pump to the hydraulic variator motor; a make-up hydraulic circuit bridging the first hydraulic line and the second hydraulic line, wherein the make-up hydraulic circuit includes first and second electronically actuatable valves having mutually exclusive open states such that when one of the first and second electronically actuatable valves is open, the other of the first and second electronically actuatable valves is closed, the first and second electronically actuatable valves reversing states in response to an electronic signal slightly prior to a torque reversal, the first electronically actuatable valve linking the first hydraulic line to a fluid source and the second electronically actuatable valve linking the second hydraulic line to the fluid source; and a flushing cooling circuit comprising a three-way valve for selectively flushing fluid from the first hydraulic line and the second hydraulic line.

2. The hydraulic variator system according to claim 1, wherein the electronically actuatable three-way valve for selectively flushing fluid from the first hydraulic line and the second hydraulic line has a first state wherein the first hydraulic line is linked to a fluid cooling facility, a second state wherein the second hydraulic line is linked to the fluid cooling facility, and a third state wherein both the first and second hydraulic lines are isolated from the fluid cooling facility.

3. The hydraulic variator system according to claim 2, wherein at least the first and second states of the electronically actuatable three-way valve are proportional states.

4. The hydraulic variator system according to claim 2, further including a controller for operating the electronically actuatable three-way valve, the controller having associated therewith a non-transitory computer-readable medium having recorded thereon computer-executable instructions including: instructions for monitoring a variator temperature; and instructions for operating the electronically actuatable three-way valve by allowing flushing to vent hydraulic fluid for cooling if the variator temperature exceeds a predetermined threshold and otherwise preventing flushing.

5. The hydraulic variator system according to claim 1, further including two-way isolation valve in series with the three-way valve.

6. The hydraulic variator system according to claim 1, further including a controller for operating the first and second electronically actuatable valves, the controller having associated therewith a non-transitory computer-readable medium having recorded thereon computer-executable instructions including: instructions for monitoring a commanded variator torque value; instructions for monitoring a pressure of the first hydraulic circuit and the second hydraulic circuit; instructions for determining whether the torque reversal is imminent based on the monitored pressure; and instructions for reversing the state of each of the first and second electronically actuatable valves if the torque reversal is imminent and if the monitored pressure is within an acceptable range.

7. The hydraulic variator system according to claim 6, wherein the monitored pressure is within an acceptable range if it is within a predetermined proximity to zero pressure.

8. The hydraulic variator system according to claim 7, wherein the instructions for reversing the state of each of the first and second electronically actuatable valves include instructions for commanding the reversal of the state of each of the first and second electronically actuatable valves prior to the torque reversal.

9. A method for providing improved torque reversal performance in a hydraulic variator system including a hydraulic variator pump linked to a hydraulic variator motor via a hydraulic circuit having separate first and second hydraulic lines connecting the hydraulic variator pump to the hydraulic variator motor, and a make-up hydraulic circuit associated with the first and second hydraulic lines, the make-up hydraulic circuit including first and second electronically actuatable valves for supplying fluid to the first and second hydraulic lines respectively, the method comprising: monitoring a commanded variator torque value; monitoring a pressure of the first hydraulic circuit and the second hydraulic circuit; determining whether a torque reversal is imminent based on the monitored pressure; and reversing a state of each of the first and second electronically actuatable valves if a torque reversal is imminent and if the monitored pressure has crossed into a predefined dead band.

10. The method according to claim 9, wherein the predefined dead band includes a range centered on a hydraulic source pressure.

11. The method according to claim 9, wherein the step of reversing the state of each of the first and second electronically actuatable valves includes commanding a reversal of the state of each of the first and second electronically actuatable valves prior to the torque reversal.

12. The method according to claim 9, wherein the hydraulic variator system further includes an electronically actuatable three-way valve and the method further comprises monitoring a variator temperature and actuating the electronically actuatable three-way valve based on the variator temperature.

13. The method according to claim 12, wherein actuating the electronically actuatable three-way valve based on the variator temperature includes allowing flushing through the electronically actuatable three-way valve if the variator temperature exceeds a predetermined threshold and otherwise preventing flushing.

14. A non-transitory computer-readable medium having recorded thereon computer-executable instructions for providing improved torque reversal performance in a hydraulic variator system including a hydraulic variator pump linked to a hydraulic variator motor via a hydraulic circuit having separate first and second hydraulic lines connecting the hydraulic variator pump to the hydraulic variator motor, and a make-up hydraulic circuit associated with the first and second hydraulic lines, the make-up hydraulic circuit including first and second electronically actuatable valves for supplying fluid to the first and second hydraulic lines respectively, the computer-executable instructions comprising: instructions for monitoring a commanded variator torque value; instructions for monitoring a pressure of the first hydraulic circuit and the second hydraulic circuit; instructions for determining whether a torque reversal is imminent based on the monitored pressure; and instructions for reversing a state of each of the first and second electronically actuatable valves if a torque reversal is imminent and if the monitored pressure has crossed into a predefined dead band.

15. The non-transitory computer-readable medium according to claim 14, wherein the predefined dead band comprises a range centered on a hydraulic source pressure.

16. The non-transitory computer-readable medium according to claim 14, wherein the instructions for reversing the state of each of the first and second electronically actuatable valves include instructions for commanding a reversal of the state of each of the first and second electronically actuatable valves prior to the torque reversal.

17. The non-transitory computer-readable medium according to claim 14, wherein the hydraulic variator system further includes an electronically actuatable three-way valve and the computer-executable instructions further include instructions for monitoring a variator temperature and actuating the electronically actuatable three-way valve based on the variator temperature.

18. The non-transitory computer-readable medium according to claim 17, wherein the instructions for actuating the electronically actuatable three-way valve based on the variator temperature includes instructions for allowing flushing through the electronically actuatable three-way valve if the variator temperature exceeds a predetermined threshold and otherwise preventing flushing.

19. The non-transitory computer-readable medium according to claim 17, wherein the instructions for actuating the electronically actuatable three-way valve based on the variator temperature include instructions for providing a proportional digital command to the electronically actuatable three-way valve.

\* \* \* \* \*